United States Patent
Holly

(10) Patent No.: US 11,815,006 B2
(45) Date of Patent: *Nov. 14, 2023

(54) PRE-CHAMBER SPARK PLUG FOR A COMBUSTION CHAMBER OF AN INTERNAL COMBUSTION ENGINE, INTERNAL COMBUSTION ENGINE, AND MOTOR VEHICLE

(71) Applicant: Mercedes-Benz Group AG, Stuttgart (DE)

(72) Inventor: Werner Holly, Merklingen (DE)

(73) Assignee: Mercedes-Benz Group AG, Stuttgart (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/907,920

(22) PCT Filed: Feb. 17, 2021

(86) PCT No.: PCT/EP2021/053803
§ 371 (c)(1),
(2) Date: Aug. 29, 2022

(87) PCT Pub. No.: WO2021/175585
PCT Pub. Date: Sep. 10, 2021

(65) Prior Publication Data
US 2023/0140543 A1    May 4, 2023

(30) Foreign Application Priority Data
Mar. 4, 2020  (DE) ..................... 10 2020 001 384.8

(51) Int. Cl.
*F02B 19/12*     (2006.01)
*F02B 19/18*     (2006.01)

(52) U.S. Cl.
CPC .............. *F02B 19/12* (2013.01); *F02B 19/18* (2013.01)

(58) Field of Classification Search
CPC .......... F02B 19/18; F02B 19/12; F02B 19/08; F02B 19/1019; F02B 19/1023; F02B 19/1014
See application file for complete search history.

(56) References Cited

U.S. PATENT DOCUMENTS

| 2013/0055986 A1 | 3/2013 | Tozzi et al. |
| 2019/0048784 A1* | 2/2019 | Ashizawa ........... F02B 19/1023 |
| 2021/0348544 A1 | 11/2021 | Holly |

FOREIGN PATENT DOCUMENTS

| DE | 10 2010 003 899 A1 | 10/2011 |
| DE | 10 2018 117 726 A1 | 2/2019 |

(Continued)

OTHER PUBLICATIONS

PCT/EP2021/053803, International Search Report dated May 14, 2021 (Two (2) pages).

(Continued)

Primary Examiner — Xiao En Mo
(74) Attorney, Agent, or Firm — Crowell & Moring LLP

(57) ABSTRACT

A pre-chamber spark plug has a pre-chamber which has openings, where, with respect to a first plane running in the longitudinal direction of the pre-chamber and dividing the pre-chamber into two halves of equal size, first openings are disposed in a first of the halves and second openings are disposed in a second of the halves. The first openings are spaced apart from a second plane running in the longitudinal direction of the pre-chamber and extending perpendicular to the first plane by a first angle in the circumferential direction of the pre-chamber. The second openings are spaced apart from the second plane by a second angle in the circumferential direction of the pre-chamber. The mean value of the first angles is smaller than the mean value of the second angles.

8 Claims, 2 Drawing Sheets

(56) References Cited

FOREIGN PATENT DOCUMENTS

| | | |
|---|---|---|
| DE | 10 2018 007 093 A1 | 3/2020 |
| EP | 2 700 796 A1 | 2/2014 |
| JP | 2006-144648 A | 6/2006 |
| JP | 2012-211594 A | 11/2012 |

OTHER PUBLICATIONS

German-language German Office Action issued in German application No. 10 2020 001 384.8 dated Oct. 12, 2020 (Eight (8) pages).
U.S. Patent Application, "Pre-Chamber Spark Plug for a Combustion Chamber of an Internal Combustion Engine, Internal Combustion Engine and Motor Vehicle", filed Sep. 2, 2022, Inventor: Werner Holly.
U.S. Patent Application, "Pre-Chamber Spark Plug for a Combustion Chamber of a Combustion Engine, Combustion Engine, and Motor Vehicle", filed Sep. 2, 2022, Inventor: Werner Holly.

\* cited by examiner

PRE-CHAMBER SPARK PLUG FOR A COMBUSTION CHAMBER OF AN INTERNAL COMBUSTION ENGINE, INTERNAL COMBUSTION ENGINE, AND MOTOR VEHICLE

BACKGROUND AND SUMMARY OF THE INVENTION

The invention relates to a pre-chamber spark plug for a combustion chamber of an internal combustion engine, in particular of a motor vehicle. Furthermore, the invention relates to an internal combustion engine for a motor vehicle. The invention also relates to a motor vehicle, in particular a motor car.

EP 2 700 796 A1 discloses a pre-combustion chamber tip of a pre-combustion chamber arrangement of an internal combustion engine. Furthermore, a pre-combustion chamber is known from US 2013/0055986 A1. In addition, a pre-chamber spark plug for an internal combustion engine is known from DE 10 2018 007 093 A1. JP 2012-211594 A discloses a pre-chamber spark plug. DE 10 2018 117 726 A1 discloses an internal combustion engine.

The object of the present invention is to provide a pre-chamber spark plug for a combustion chamber of an internal combustion engine, an internal combustion engine having at least one such pre-chamber spark plug, and a motor vehicle, so that particularly advantageous operation of the internal combustion engine can be realized.

A first aspect of the invention relates to a pre-chamber spark plug for a combustion chamber of an internal combustion engine, also referred to as an IC engine, in particular for a motor vehicle. The pre-chamber spark plug has a pre-chamber with a plurality of openings, for example in the form of through-openings, via which the pre-chamber is fluidically connectable to the combustion chamber. In particular, the opening can run straight, or rather in a straight line, in particular over its entire length. A fuel-air mixture, also referred to simply as a mixture, can be introduced from the combustion chamber into the pre-chamber via the various openings. For example, at least one ignition spark can be generated in the pre-chamber. For this purpose, the pre-chamber spark plug comprises, for example, at least one electrode device, which is arranged at least partially in the pre-chamber. By means of the electrode device, the aforementioned ignition spark can be generated in the pre-chamber. By means of the ignition spark, the fuel-air mixture which has flowed into the pre-chamber via the openings can be sparked or ignited and subsequently burned in the pre-chamber so that, for example, flames or burning flares resulting from the ignition and combustion of the mixture can flow out of the pre-chamber via the openings and can enter or flow into the combustion chamber. As a result, for example, the mixture remaining in the combustion chamber is ignited and burned in the combustion chamber.

Each opening has a flow cross-section through which the mixture or the flare in question can flow. The flow cross-section is thus, for example, an area through which the mixture can flow or has an area or surface area and can be passed through by the mixture. In particular, the flow cross-section is to be understood to be the smallest or lowest flow cross-section of each opening through which the mixture can flow.

In order to be able to realize a particularly advantageous operation of the internal combustion engine, it is provided in accordance with the invention that, with respect to an imaginary or virtual first plane running in the longitudinal direction of the pre-chamber, that is to say running parallel to the longitudinal direction of the pre-chamber and thus of the pre-chamber spark plug as a whole, and dividing the pre-chamber into two halves of equal size, a plurality of first openings and thus, for example, at least two or at least three first openings, are arranged in a first of the halves, and a plurality of second openings, that is to say at least two or preferably at least three second openings are arranged in the second half. In this case, the first openings arranged in the first half are spaced apart from an imaginary second plane by a first angle, for example lying in the first half, in the circumferential direction of the pre-chamber running in particular around the longitudinal direction of the pre-chamber, wherein the imaginary or virtual second plane runs in the longitudinal direction of the pre-chamber, that is to say parallel to the longitudinal direction of the pre-chamber, and at the same time extends perpendicular to the first plane. Here, the second openings are spaced apart from the second plane by a second angle, for example lying in the second half, in the circumferential direction of the pre-chamber. Furthermore, it is provided in accordance with the invention that the mean value of the first angles is smaller than the mean value of the second angles. In particular, the mean value is to be understood as the arithmetic mean value, also referred to as the arithmetic mean. Thus, for example, the first mean value is obtained by dividing, i.e., splitting, the sum of the or all first angles, in particular those lying in the first half, by the number of the or all first angles. Accordingly, the second mean value is obtained, for example, by dividing, i.e., splitting, the sum of the or all second angles, in particular those lying in the second half, by the number of the or all second angles.

In order to realize a particularly advantageous operation, it is also provided that the planes intersect in an imaginary axis running as a whole in the longitudinal direction of the pre-chamber and thus of the pre-chamber spark plug. In this case, the openings around the axis in which the planes intersect are rotationally asymmetrical. In other words, the axis runs parallel to the longitudinal direction of the pre-chamber. The aforementioned axis is, for example, a longitudinal central axis of the pre-chamber, also referred to as the main axis, which can, for example, be rotationally symmetrical with respect to the axis or with respect to the longitudinal central axis, which is also referred to as the longitudinal axis.

In addition, it is provided in accordance with the invention that the openings are rotationally asymmetrical about the imaginary axis running in the plane. This means, for example, that the openings are arranged asymmetrically, i.e., unevenly distributed, about the axis and thus in the circumferential direction of the pre-chamber or pre-chamber spark plug running about the axis. Alternatively or additionally, the feature that the openings around the axis are rotationally asymmetrical can be understood to mean that the or all openings around the axis follow one another in an uneven or disordered manner, i.e., not according to a regular sequence, in particular with regard to the different angles. In other words, the rotationally asymmetric embodiment can be understood to mean that the or all angles around the axis are uneven or disordered, i.e., do not follow one another in a regular sequence.

Furthermore, it is conceivable that at least two of the openings differ from one another in their geometry, in particular in the geometry of their respective flow cross-sections, and in so doing have a rotationally asymmetrical sequence, in particular around the axis. This means in particular that the flow cross-sections of these at least two openings differ from one another, in particular with regard to their shape and/or size, i.e., area or surface area, wherein the at least two openings or preferably all the openings have a rotationally asymmetrical sequence around the axis. This means in particular that the at least two openings or preferably all openings around the axis follow each other in an uneven or disordered manner, i.e., not according to a regular sequence.

Due to this rotationally asymmetrical arrangement or embodiment of the openings, the openings are formed to cause a tumble-shaped flow, also referred to as a cylindrical flow, cylinder flow or tumble flow, of the fuel-air mixture flowing into the pre-chamber via the openings. In other words, during a fired operation of the internal combustion engine, the openings cause, for example by their arrangement and/or their number and/or their geometry, a tumble-shaped flow of the fuel-air mixture, also referred to simply as a mixture, flowing through the openings and thereby flowing from the combustion chamber into the pre-chamber, which thus has a or the tumble-shaped flow at least in the pre-chamber. Expressed again in other words, the openings, which are formed for example as through-openings, impress an at least substantially tumble-shaped and thus cylindrical flow, also referred to as tumble flow, onto the mixture flowing through the openings and thus flowing from the combustion chamber, also referred to as the main combustion chamber, into the pre-chamber, so that particularly advantageous operation of the pre-chamber spark plug and thus of the internal combustion engine as a whole can be realized. The tumble-shaped flow is a flow that is at least substantially cylindrical in at least one or exactly one cylinder plane. This cylinder plane runs, for example, in the longitudinal direction of the pre-chamber spark plug and can be the first plane or the second plane, or the cylinder plane is a third plane which runs obliquely to the first plane and obliquely to the second plane. In particular, the tumble-shaped flow runs cylindrically around a cylinder axis which runs perpendicular to the cylinder plane and is thus a or the plane normal of the cylinder plane. For example, the cylinder axis runs in the first plane.

In contrast to a flow which is rotationally symmetrical, in particular with respect to the axis, and which extends, for example, in a helical or ring-like manner around the main axis or around the longitudinal axis of the pre-chamber, the tumble-shaped flow is a cylindrical flow, also referred to as a cylinder flow, which extends, for example, at least partially in the plane of the cylinder or runs in the plane of the cylinder in which, for example, the axis, in particular the main axis, lies or runs. The aforementioned, conventionally provided rotationally symmetrical flow can result in particular from an arrangement and embodiment of the openings that is rotationally symmetrical, in particular with respect to the axis, wherein now, however, in accordance with the invention, an arrangement or embodiment of the openings that is rotationally asymmetrical with respect to the axis is provided.

The tumble flow positively influences the combustion in the pre-chamber in several ways, whereby a particularly large operating range of the pre-chamber spark plug or in the pre-chamber can be realized. On the one hand, there is better purging of residual gas in the region of a spark plug gap, which is formed or delimited, for example, by electrodes, in particular by ends of the electrodes. The electrodes are, for example, electrodes of the aforementioned electrode device. The ends, in particular free ends, are arranged in the pre-chamber, for example. The ignition spark for igniting the mixture in the pre-chamber can be generated in the spark plug gap, for example, by means of the electrodes. Due to the improved purging, a more stable ignition can be ensured. Compared to conventional spark plugs, there is a more favourable convection of an initial flame core in the direction of the openings, also called nozzles or formed as nozzles. Due to the improved purging and due to the more favourable convection, each electrode of the pre-chamber spark plug can be configured in a manner more favourable to combustion, in particular with regard to a lower penetration depth of the electrode formed, for example, as a ground electrode. This results in a smaller surface area, which in turn results in lower wall heat losses. This can reduce the tendency for pre-ignition compared to conventional pre-chamber spark plugs.

In conventional pre-chamber spark plugs, the openings cause an at least substantially rotationally symmetrical flow of the mixture flowing through the openings and thus flowing from the combustion chamber into the pre-chamber, in particular due to their rotationally symmetrical arrangement. The disadvantage of this is that the initial flame core is not convected or is convected away from the openings, which are also referred to as pre-chamber nozzles. In order to ensure sufficiently low residual gas contents in the region of the spark plug gap in conventional pre-chamber spark plugs, a long electrode that projects deep into the pre-chamber must usually be used. This results in a jagged surface in the pre-chamber as well as a large dead volume. The previously mentioned problems and disadvantages can now be avoided with the pre-chamber spark plug according to the invention.

The combustion in the pre-chamber is stabilised and improved by the tumble flow. This enlarges the working area of the pre-chamber spark plug, so that a more stable ignition when idling and a lower risk of pre-ignition at full load can be realized. Furthermore, the improved combustion results in a greater pressure rise in the pre-chamber and consequently a deeper flare penetration depth into the combustion chamber. This also improves combustion in the combustion chamber, which is also referred to as the main combustion chamber. The flare penetration depth means in particular a distance or depth or path over which the flares penetrate into the pre-chamber or combustion chamber. The flare results from the fact that the mixture is ignited in the pre-chamber and subsequently burned.

Traditionally, pre-chamber spark plugs can be differentiated according to the flow structure in the pre-chamber. In particular, according to the prior art, a distinction can be made between structureless (chaotic) flow forms in the pre-chamber and rotationally symmetrical flow forms. The flow structure is determined in particular by the arrangement of the openings and by the configuration of the openings. For rotationally symmetrical flow structures according to the prior art, the arrangement of the openings is rotationally symmetrical about the aforementioned axis, which is, for example, the main axis of the pre-chamber.

According to the invention, however, a rotationally asymmetrical embodiment and arrangement of the openings is now provided, so that a particularly advantageous operation can be realized.

Each opening is formed as a bore. Alternatively or additionally, the flow cross-sections of at least two of the openings differ from each other with regard to their shape. Alternatively or additionally, the pre-chamber is rotationally symmetrical with respect to the axis.

It has proved here to be particularly advantageous if the openings are arranged along an imaginary circle of which the center lies on the axis, wherein the first plane divides the circle into two imaginary halves of equal size. In this case, for example, a first of the halves of the circle is arranged, in particular completely, in the first half of the pre-chamber, wherein, for example, the second half of the circle is arranged or runs, in particular completely, in the second half of the pre-chamber. Each half of the pre-chamber is also referred to as the pre-chamber half or chamber half.

A further embodiment is distinguished in that a or the number of the openings arranged in the first half is greater than a or the number of the openings arranged in the second half.

In a further, particularly advantageous embodiment of the invention, each opening has the aforementioned corresponding flow cross-section. In this case, it is preferably provided that the sum of the flow cross-sections of the openings arranged in the first half is greater than the sum of the flow cross-sections of the openings arranged in the second half. The feature that the openings are arranged along the imaginary circle can in particular be understood to mean that the various center points or geometric centers of gravity, in particular the centers of gravity of the areas, of the openings or the flow cross-sections are arranged on the imaginary circle, more specifically along the circle, in particular consecutively.

Since, for example, the sum of the flow cross-sections of the openings arranged in the first half or on the first half of the circle is greater than the sum of the flow cross-sections of the openings arranged in the second half or on the second half of the circle, the openings can impress a particularly advantageous tumble-shaped flow onto the mixture flowing through the openings and thus into the pre-chamber.

A further embodiment is distinguished in that the or all flow cross-sections of the openings arranged in the first half are larger than the or all flow cross-sections of the openings arranged in the second half. This ensures particularly advantageous flow conditions and thus particularly advantageous operation.

In a further embodiment of the invention, the mean value of the flow cross-sections of the first openings arranged in the first half is greater than the mean value of the flow cross-sections of the second openings arranged in the second half. These respective mean values are also preferably to be understood as the arithmetic mean.

For example, the various openings and thus their respective flow cross-sections, in particular all flow cross-sections, are circular, so that each flow cross-section has a corresponding diameter. It is preferably provided that the or all diameters of the first openings arranged in the first half are larger than the or all diameters of the second openings arranged in the second half.

A second aspect of the invention relates to an internal combustion engine, preferably in the form of a reciprocating piston engine, for a motor vehicle, which may preferably be in the form of a motor car and very preferably in the form of a passenger car or a commercial vehicle. The internal combustion engine has at least one combustion chamber. The combustion chamber is, for example, partially delimited by a cylinder and by a piston of the internal combustion engine arranged in the cylinder such that the piston can move in translation, wherein the cylinder is formed or delimited, for example, by an engine housing of the internal combustion engine formed in particular as a crankcase or cylinder crankcase. In addition, the combustion chamber is, for example, partially delimited by a combustion chamber roof, which is formed, for example, by a cylinder head formed separately from the engine housing and connected to the engine housing. The internal combustion engine additionally comprises at least one pre-chamber spark plug associated with the combustion chamber, for example at least partially arranged in the combustion chamber. The pre-chamber spark plug comprises a pre-chamber with a plurality of openings via which the pre-chamber is fluidically connected to the combustion chamber, which is also referred to as the main combustion chamber. A fuel-air mixture, also referred to simply as a mixture, can be introduced or can flow into the pre-chamber from the combustion chamber via the openings. In other words, for example, the aforementioned fuel-air mixture is formed in the combustion chamber or the fuel-air mixture is introduced into the combustion chamber. For example, fuel, in particular liquid fuel, and air are introduced into the combustion chamber. For example, the fuel is injected directly into the combustion chamber. The aforementioned mixture comprises here the air and the fuel that are introduced into the combustion chamber. At least part of the mixture from the combustion chamber can flow through the openings and thus enter the pre-chamber via the openings. In the pre-chamber, the part of the mixture can be ignited and burned, resulting in the flares described previously. The flares can then flow out of the pre-chamber via the openings and can flow into the main combustion chamber, where they ignite and subsequently burn the rest of the mixture remaining in the main combustion chamber. Each opening has here, for example, a flow cross-section through which the mixture or the particle flare can flow.

In order to now be able to realize a particularly advantageous operation, it is provided in accordance with the invention that, with respect to an imaginary first plane running in the longitudinal direction of the pre-chamber and dividing the pre-chamber into two halves of equal size, a plurality of first openings are arranged in a first of the halves of the pre-chamber, wherein a plurality of second openings are arranged in the second half of the pre-chamber. The first openings are spaced apart in the circumferential direction of the pre-chamber by a first angle lying in the first half from an imaginary second plane running in the longitudinal direction of the pre-chamber and extending perpendicular to the first plane. The second openings are spaced apart from the second plane in the circumferential direction of the pre-chamber by a second angle lying in the second half. The mean value of all the first angles is smaller here than the mean value of the or all second angles. In order to realize a particularly advantageous operation, it is further provided that the planes intersect in an imaginary axis extending in the longitudinal direction of the pre-chamber and thus of the pre-chamber spark plug as a whole. In this case, the openings around the axis in which the planes intersect are rotationally asymmetrical. In other words, the axis runs parallel to the longitudinal direction of the pre-chamber. Each opening is formed as a bore. Alternatively or additionally, the flow cross-sections of at least two of the openings differ from each other with respect to their shape. Alternatively or additionally, the pre-chamber is rotationally symmetrical with respect to the axis. Advantages and advantageous embodiments of the first aspect of the invention are to be regarded as advantages and advantageous embodiments of the second aspect of the invention, and vice versa.

Preferably, the internal combustion engine is formed as a reciprocating piston engine, whereby a particularly advantageous operation can be ensured.

A third aspect of the invention relates to a motor vehicle, preferably in the form of a motor car, which has an internal combustion engine according to the invention in accordance with the second aspect of the invention. The motor vehicle is drivable here by means of the internal combustion engine. Advantages and advantageous embodiments of the first and second aspects of the invention are to be regarded as advantages and advantageous embodiments of the third aspect of the invention, and vice versa.

Further advantages, features and details of the invention will become apparent from the following description of a preferred exemplary embodiment and from the drawings. The features and combinations of features mentioned above in the description, as well as the features and combinations of features mentioned below in the description of the figures and/or shown alone in the figures, can be used not only in the combination indicated in each case, but also in other combinations or on their own, without departing from the scope of the invention.

DETAILED DESCRIPTION OF THE DRAWINGS

In the figures, like or functionally like elements are provided with like reference signs.

Figure 1:
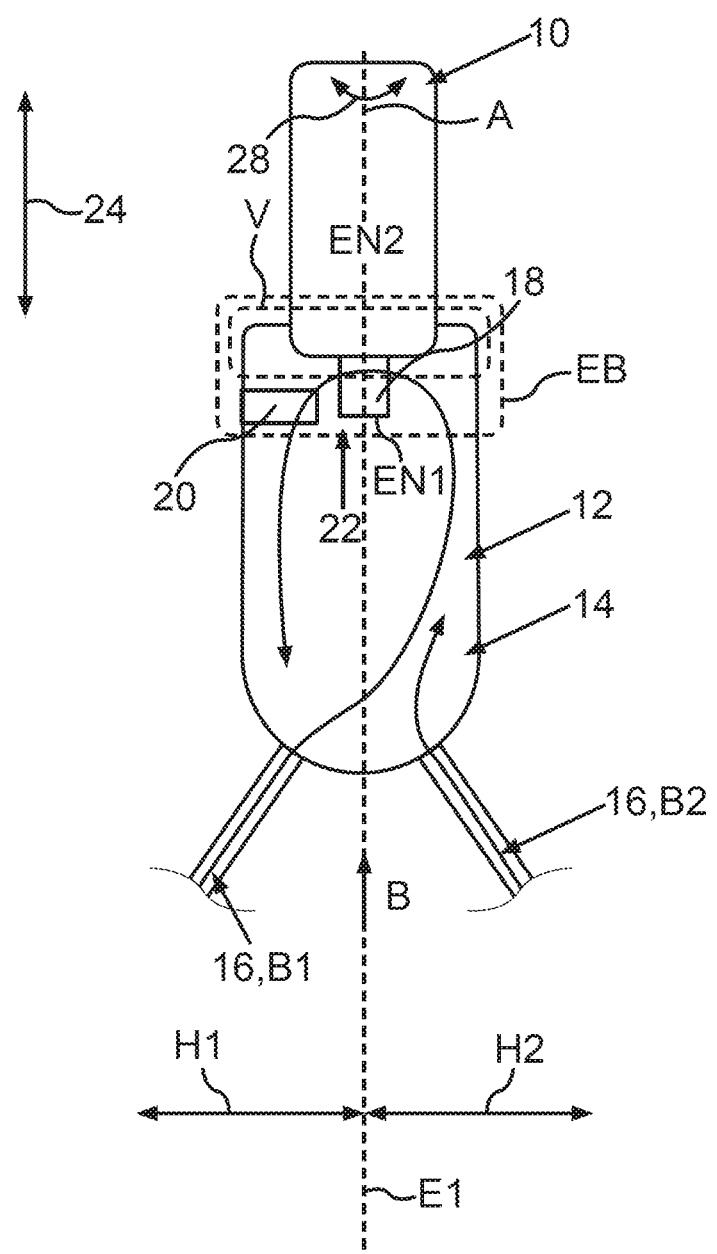
FIG. 1 shows a schematic and sectional side view of a pre-chamber spark plug according to the invention for a combustion chamber of an internal combustion engine of a motor vehicle.

FIG. 1 shows a schematic and sectional side view of a pre-chamber spark plug 10 for a combustion chamber, formed for example by a cylinder or as a cylinder or at least partially delimited by a cylinder, of an internal combustion engine, formed for example as a reciprocating piston engine, of a motor vehicle, in particular a motor car, such as a passenger car or a commercial vehicle. The motor vehicle can be driven by means of the internal combustion engine. The pre-chamber spark plug 10 has at least one or exactly one pre-chamber 12, the contour of which is denoted by 14 in FIG. 1. The pre-chamber 12 has a plurality of openings 16, also referred to as nozzles and formed as through-openings, which can also be seen particularly well in FIG. 2. The pre-chamber 12 is fluidically connectable or connected to the combustion chamber via the openings 16. In its fully manufactured state, the internal combustion engine has the aforementioned combustion chamber and the pre-chamber spark plug 10, so that in the fully manufactured state of the internal combustion engine, the pre-chamber 12 is fluidically connected to the combustion chamber via the openings 16. As a result, a fuel-air mixture, also referred to simply as a mixture, from the combustion chamber, also referred to as the main combustion chamber, can at least partially flow through the openings 16 and can thus flow into the pre-chamber 12, so that at least part of the fuel-air mixture, also referred to simply as a mixture, from the combustion chamber can flow through the openings 16 and can thus flow into the pre-chamber 12 via the openings 16. The combustion chamber is also delimited, for example, by a piston of the internal combustion engine.

The pre-chamber spark plug 10 has at least two or exactly two electrodes 18 and 20 of an electrode device 22 arranged at least partially in the pre-chamber 12. In particular, free ends EN1 and EN2 of the electrodes 18 and 20 are arranged in the pre-chamber 12 and are spaced apart from one another. The electrode 18 is formed, for example, as a so-called center electrode, wherein the electrode 20 is formed, for example, as a so-called ground electrode. By means of the electrode device 22, in particular by means of the electrodes 18 and 20, at least one ignition spark can be generated in the pre-chamber 12, in particular during fired operation of the internal combustion engine and/or within an operating cycle of the internal combustion engine, in particular at an ignition location also referred to as a spark location. In particular, the ignition spark can be generated by means of the electrodes 18 and 20 between the electrodes 18 and 20, in particular between the ends EN1 and EN2, so that, for example, the electrodes 18 and 20, in particular the ends EN1 and EN2, form, define, bound or delimit the ignition location. By means of the ignition spark, the mixture which has flowed into the pre-chamber 12 via the openings 16 can be ignited, whereby the mixture is burned in the pre-chamber 12. This results in burning flares that flow through the openings 16 and thus flow out of the pre-chamber 12 into the combustion chamber via the openings 16. As a result, for example, a part of the mixture remaining in the main combustion chamber is ignited and subsequently burned, thus driving the piston. In other words, the electrodes 18 and 20 can be used to generate or provide the ignition spark at the ignition location in the pre-chamber 12.

Figure 2:
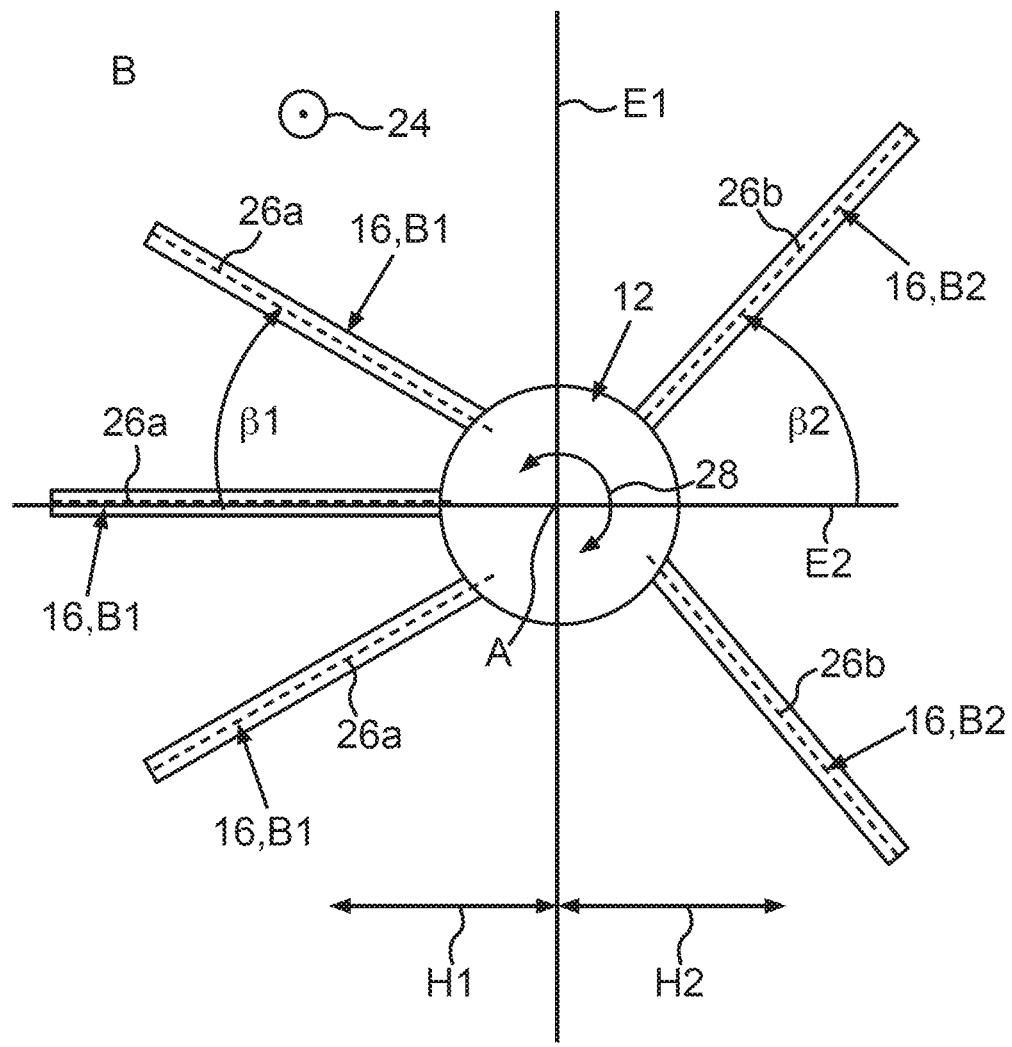
FIG. 2 shows a schematic view of the pre-chamber spark plug in a viewing direction denoted B in FIG. 1.

In FIGS. 1 and 2, a first, imaginary plane E1 can be seen, which runs in the longitudinal direction of the pre-chamber spark plug 10 and thus of the pre-chamber 12. In other words, the plane E1 runs parallel to the longitudinal direction of the pre-chamber 12, or rather the pre-chamber spark plug 10, wherein the longitudinal direction in FIG. 1 is illustrated by a double arrow 24. In addition, an axis A can be seen in FIGS. 1 and 2, which is a or the main axis of the pre-chamber 12 and thus of the pre-chamber spark plug 10. The main axis is also referred to as the longitudinal axis or longitudinal central axis, wherein, for example, the pre-chamber 12 is rotationally symmetrical with respect to the axis A. In this case, for example, the openings 16 are arranged around the axis A, in particular along a circle, the center of which lies on the axis A, for example. The axis A lies in or runs in the plane E1, wherein the plane E1 runs perpendicular to the image plane of FIG. 1 and perpendicular to the image plane of FIG. 2.

It can be seen from FIGS. 1 and 2 that the imaginary plane E1 divides or splits the pre-chamber 12 into two halves H1 and H2 of equal size, also referred to as chamber halves or pre-chamber halves. The first of the openings 16, denoted B1, are arranged, in particular completely, in the first half H1. The second of the openings 16, denoted B2, are arranged, in particular completely, in the second half H2.

In addition, an imaginary or virtual second plane E2 can be seen in FIG. 2. The second, imaginary plane E2 also runs parallel to the longitudinal direction or in the longitudinal direction of the pre-chamber 12 and thus of the pre-chamber spark plug 10, wherein the second plane E2 simultaneously runs perpendicular to the first plane E1. The planes E1 and E2 intersect in the axis A, as can be seen particularly well in FIG. 2. Furthermore, it can be seen from FIG. 2 that each first opening B1 arranged in the first half H1 is spaced apart from the second plane E2 in the circumferential direction of the pre-chamber 12 and thus of the pre-chamber spark plug 10 as a whole by a first angle β1 which is located in particular in the first half H1 or is arranged on the side of the half H1 and extends, for example, in the circumferential direction of the pre-chamber 12. This shall be understood to mean in particular that each opening B1 forms with the plane E2 a first angle β1 lying for example in the half H1. Accordingly, each second opening B2 arranged in the second half H2 is spaced apart from the second plane E2 in the circumferential direction of the pre-chamber 12 and thus of the pre-chamber spark plug 10 as a whole by a second angle β2 lying in particular in the second half H2. This means that each second opening B2 arranged in the second half H2 forms with the second plane E2 a second angle β2 lying, for example, in the second half H2 and extending, for example, in the circumferential direction of the pre-chamber 12.

Furthermore, the axes of the openings B1 and B2 are marked 26a and 26b respectively. Here, the axis 26a of one of the openings B1 runs in the plane E2. Each axis 26a or 26b coincides with a corresponding direction of passage along which the mixture can flow from the combustion chamber through the corresponding aperture B1 or B2 and thus into the pre-chamber 12. In addition, the particular flare resulting from the ignition of the mixture in the pre-chamber 12 can flow through the corresponding opening B1 or B2 and thus flow out of the pre-chamber 12 into the combustion chamber. In this case, each axis 26a or 26b forms the first angle β1 or second angle β2, respectively, with the plane E2.

Furthermore, it is provided in the pre-chamber spark plug 10 that the mean value of the or all first angles β1 is smaller than the mean value of the or all second angles β2. As a result, the openings 16 cause an at least substantially tumble-shaped, that is to say cylindrical, flow of the mixture flowing through the openings 16 and thereby flowing into the pre-chamber 12 via the openings 16, wherein the tumble-shaped flow of the mixture takes place or occurs in the pre-chamber 12. In addition, the or all openings 16 are straight or run in a straight line over their entire extent. Due to the described embodiment of the openings 16, the openings 16 are formed to generate the tumble-shaped flow of the mixture. This tumble-shaped flow of the mixture in the pre-chamber 12 is shown in FIG. 1 by arrows. By means of the arrows, it can be seen that the tumble-shaped flow is cylindrical in a cylinder plane, wherein the cylinder plane is parallel to the plane E2, for example, or is the plane E2. In particular, the arrows shown in FIG. 1 illustrate a contour of the tumble-shaped flow, also referred to as a flow contour.

In particular, the tumble-shaped flow runs cylindrically about a or the plane normal of the cylinder plane, wherein the plane normal runs, for example, in the plane E1 and perpendicular to the axis A.

Since the mean value of the first angle β1 is smaller than the mean value of the second angle β2, the openings 16 are configured or arranged rotationally asymmetrically about the axis A, whereby the tumble-shaped flow can be realized particularly advantageously. In particular, the tumble-shaped flow is thus effected by the distribution of the openings 16 about the axis A and/or by a corresponding number of the openings 16 and/or by the particular geometry of the openings 16, in particular their flow cross-sections. In particular, the angle β1 or β2 is a radial angle formed in the corresponding half H1 or H2 by the corresponding axis 26a or 26b and the plane E2. In particular, the angle β1 or β2 or the angular sector of β1 and β2 that has the smallest numerical value is used. In other words, each axis 26a or 26b can basically form several angles with the plane E2, since the axis in question 26a or 26b is an infinite straight line and the plane E2 basically extends infinitely. The angle β1 or β2 is the smallest of the angles formed by the corresponding axis 26a or 26b and the plane E2.

In addition, in FIG. 1 an electrode region is denoted EB, in which, for example, the electrodes 18 and 20, in particular their ends EN1 and EN2, are arranged in the pre-chamber 12. Due to the tumble-shaped flow, a volume V of the pre-chamber 12, also referred to as the dead volume, can be kept particularly low, so that a particularly large operating range of the pre-chamber spark plug 10 can be ensured. Thus, a particularly advantageous operation can be realized.

The circumferential direction of the pre-chamber 12 runs here around the axis A and is illustrated in FIG. 1 by a double arrow 28. As can be seen in FIG. 2, the pre-chamber 12 can be divided into four quadrants by the planes E1 and E2. The planes E1 and E2 are perpendicular here to each other, and the planes E1 and E2 intersect in the axis A, which thus runs in both planes E1 and E2.

The tumble flow has a flow center which is orthogonal to the main axis or axis A of the pre-chamber 12. The flow center is a cylinder axis around which the tumble flow runs cylindrically. In the present case the cylinder axis runs perpendicular or orthogonal to the plane E2 and, for example, in the plane E1 or parallel to the plane E1, so that the plane E2 is the aforementioned cylinder plane. The tumble flow can be defined here as a flow structure in which the flow of the mixture in the second half H2 flows upwards from the openings 16 in the direction of the electrode region EB, which is also referred to as an upward flow. Thereafter, the flow passes through the electrode region EB, whereupon the flow flows downwards away from the electrode region EB, thereby flowing towards the apertures 16, which is also referred to as downward flow. Thus, the tumble flow is a structured flow form, which, however, is not rotationally symmetrical to the pre-chamber main axis or to the main axis of the pre-chamber 12.

LIST OF REFERENCE CHARACTERS 10 pre-chamber spark plug
12 pre-chamber
14 contour
16 opening
18 electrode
20 electrode
22 electrode device
24 double arrow
26a, b axis
28 double arrow
A axis
B1 opening
B2 opening
EB electrode region
EN1 end
EN2 end
E1 plane
E2 plane
H1 half
H2 half
β1 angle
β2 angle

The invention claimed is:

1. A pre-chamber spark plug (10) for a combustion chamber of an internal combustion engine, comprising:
a pre-chamber (12) which has a plurality of openings (16, B1, B2) and which is fluidically connectable to the combustion chamber via the plurality of openings (16, B1, B2), wherein a fuel-air mixture is introducible from the combustion chamber into the pre-chamber (12) via the plurality of openings (16, B1, B2) and wherein each of the plurality of openings (16, B1, B2) has a respective flow cross-section through which the fuel-air mixture is flowable;
wherein, with respect to an imaginary first plane (E1) running in a longitudinal direction (24) of the pre-chamber (12) and dividing the pre-chamber (12) into a first half (H1) and a second half (H2) of equal size, first openings (B1) of the plurality of openings (16, B1, B2) are disposed in the first half (H1) and second openings (B2) of the plurality of openings (16, B1, B2) are disposed in the second half (H2);

wherein the first openings (B1) are spaced apart from an imaginary second plane (E2) running in the longitudinal direction (24) of the pre-chamber (12), wherein the second plane (E2) extends perpendicular to the imaginary first plane (E1), by a first angle (ß1) in a circumferential direction (28) of the pre-chamber (12);

wherein the second openings (B2) are spaced apart from the imaginary second plane (E2) by a second angle (ß2) in the circumferential direction (28) of the pre-chamber (12);

wherein a mean value of the first angles (ß1) is smaller than a mean value of the second angles (ß2) such that the plurality of openings (16, B1, B2) are configured rotationally asymmetrically about an imaginary axis (A) running in the longitudinal direction (24) of the pre-chamber (12) in which the imaginary first and second planes (E1, E2) intersect such that all of the plurality of openings (16, B1, B2) follow one another in an uneven or disordered manner which is not a regular sequence and such that the rotationally asymmetrical configuration of the plurality of openings (16, B1, B2) causes a tumble-shaped flow in the pre-chamber (12) of a fuel-air mixture that is introduced from the combustion chamber into the pre-chamber (12) via the plurality of openings (16, B1, B2);

wherein the plurality of openings (16, B1, B2) are formed as bores; and/or wherein the flow cross-sections of at least two of the plurality of openings (16, B1, B2) differ from each other with regard to a respective shape; and/or the pre-chamber (12) is rotationally symmetrical with respect to the imaginary axis (A).

2. The pre-chamber spark plug (10) according to claim 1, wherein the plurality of openings (16, B1, B2) are disposed along an imaginary circle, wherein a center of the imaginary circle lies on the imaginary axis (A), and wherein the imaginary first plane (E1) divides the imaginary circle into two halves of equal size.

3. The pre-chamber spark plug (10) according to claim 1, wherein a number of the first openings (B1) disposed in the first half (H1) is greater than a number of the second openings (B2) disposed in the second half (H2).

4. The pre-chamber spark plug (10) according to claim 1, wherein a sum of the flow cross-sections of the first openings (B1) disposed in the first half (H1) is greater than a sum of the flow cross-sections of the second openings (B2) disposed in the second half (H2).

5. The pre-chamber spark plug (10) according to claim 4, wherein the flow cross sections of the first openings (B1) disposed in the first half (H1) are larger than the flow cross sections of the second openings (B2) disposed in the second half (H2).

6. The pre-chamber spark plug (10) according to claim 4, wherein a mean value of the flow cross-sections of the first openings (B1) disposed in the first half (H1) is greater than a mean value of the flow cross-sections of the second openings (B2) disposed in the second half (H2).

7. An internal combustion engine for a motor vehicle, comprising:
a combustion chamber; and
the pre-chamber spark plug (10) according to claim 1.

8. A motor vehicle, comprising:
an internal combustion engine with a combustion chamber; and
the pre-chamber spark plug (10) according to claim 1.

* * * * *